R. C. JAMES.
Cane-Strippers.

No. 141,057.  Patented July 22, 1873.

Witnesses:  
E. Wolff  
O. Sedgwick

Inventor:  
R. C. James  
Per  
Munn & Co  
Attorneys.

UNITED STATES PATENT OFFICE.

ROBERT C. JAMES, OF DENISON, TEXAS.

IMPROVEMENT IN CANE-STRIPPERS.

Specification forming part of Letters Patent No. 141,057, dated July 22, 1873; application filed April 19, 1873.

*To all whom it may concern:*

Be it known that I, ROBERT C. JAMES, of Denison, in the county of Grayson and State of Texas, have invented a new and Improved Cane-Stripper, of which the following is a specification:

My invention is an improvement in cane-strippers of the class in which a pair of drawing-rolls are arranged in combination with a fixed and movable spring stripping-blade. The improvement relates to the arrangement of stripping-blades and troughs or channels for receiving the juice of the cane, as hereinafter described.

Figure 1:
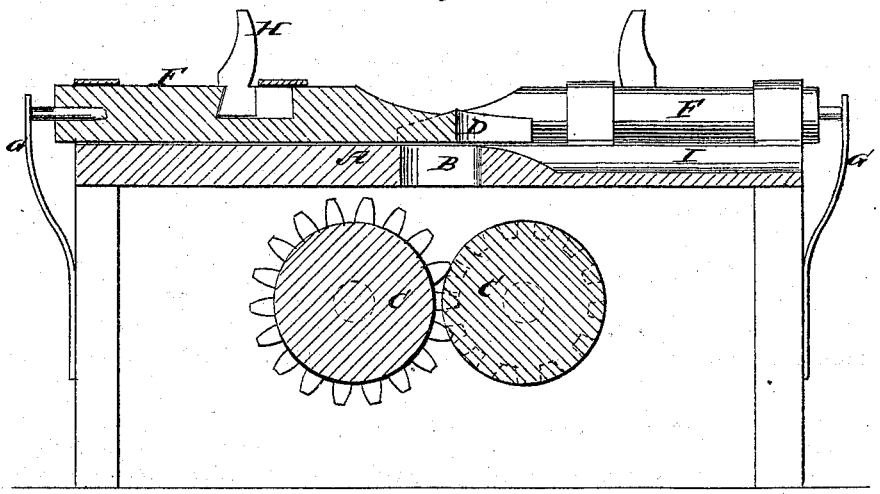
Figure 2:
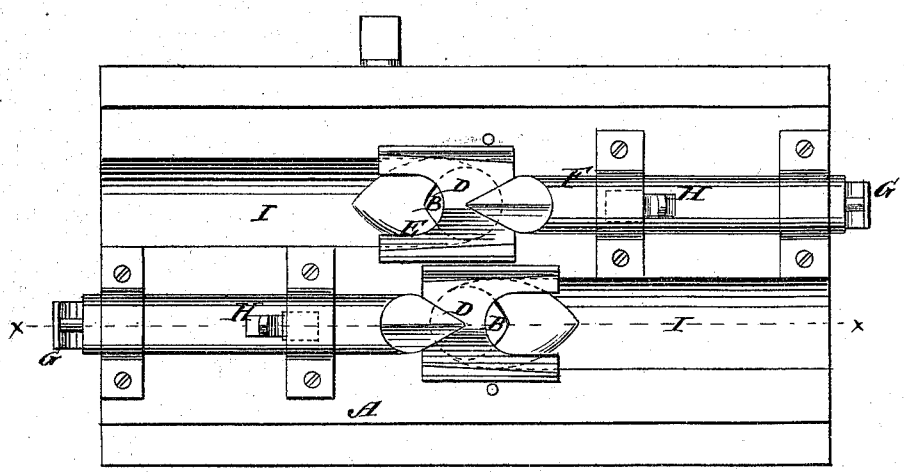

Figure 1 is a sectional elevation of my improved machine taken on the line $x\ x$ of Fig. 2, which latter is a plan view.

A represents the table; B, a series of holes through it; C, the drawing-rollers below the table for drawing the cane through the holes to be stripped. D represents the stripping-blades. They consist of a thin plate of metal with notches F in one end, and arranged on the table, one to each hole, in a sliding stock, E, with which there is a spring, G, arranged to push the stripper over the hole. H is a handle on the stripper-stocks, by which the slide is thrown back by hand to uncover the hole when the cane is to be put in. On the side of the hole opposite to the stripping-blade there is a groove, I, to receive the juice expressed by the stripping and conduct it away.

A single stack is passed through each hole to the rollers below by the attendant, so as to be seized by them and pulled through while the stripping-blades are bearing against them on one side and pressing them against the side of the hole on the other, which strips off the leaves and other substances suitable for fodder, and prevents them from going into the kettle, and saves a large amount of skimming.

Having thus described my invention, I claim as new and desire to secure by Letters Patent—

The combination, with the stripping-blades D, of the grooves or troughs I, as described.

ROBERT C. JAMES.

Witnesses:
ROBERT I. McMANUS,
W. B. MUNSON.